UNITED STATES PATENT OFFICE.

CHARLES LESLIE BONSTEEL, OF MOOSE JAW, SASKATCHEWAN, CANADA.

SOLDER-FLUX.

1,332,160.  Specification of Letters Patent.  Patented Feb. 24, 1920.

No Drawing.  Application filed January 11, 1919. Serial No. 270,717.

*To all whom it may concern:*

Be it known that I, CHARLES LESLIE BONSTEEL, a subject of the King of Great Britain, and resident of the city of Moose Jaw, in the Province of Saskatchewan, in the Dominion of Canada, have invented certain new and useful Improvements in Solder-Flux, as described in the following specification.

The object of this invention is to produce a flux which will render possible the soldering of iron or steel surfaces and which may also be used with galvanized plated or tinned surfaces.

The invention consists in the novel admixture of ingredients in or about the proportions named and in the manner of amalgamating same as hereinafter set forth.

The mixture of ingredients which have been found in practical application to effect the desired result of fluxing soft solder to iron or steel surfaces comprises the following in or about the proportions named:

| | |
|---|---|
| Ox lard | 40 parts |
| Resin | 40 " |
| Sesame | 20 " |
| Zinc chlorid | 12 " |
| Water | 12 " |

In preparing the flux the ox lard, resin and zinc chlorid are first melted together. The sesame, which is a veritable compound and the water are boiled until they assume a pasty form and this paste is then introduced into the other molten mixture and stirred thoroughly. The mixture when cool, forms a soft paste which is spread over the surface of the materials to be soldered.

The sesame coöperates with the zinc chlorid under the action of heat in flowing the solder to open the pores of the metal so that the solder will obtain a binding hold upon the surface of the metal. Sulfur may be substituted for the sesame compound but it does not produce as effective a result.

The ox lard is used as a softener to prevent crystallization and hardening of the flux and it may be substituted by other forms of grease but its use is preferred, as it does not discolor or gum up the work and produces a very uniform flux.

The flux herein described effects a thorough union between ordinary soft solder and iron or steel surfaces and is also effective with other metals.

What I claim as my invention is:—

1. A solder flux comprising, zinc chlorid, resin, sesame and a suitable non-hardening grease.

2. A solder flux comprising, an admixture in or about the following proportions, ox lard, 40 parts, resin 40 parts, zinc chlorid 12 parts, and a mixture of sesame 20 parts with water 12 parts.

3. A solder flux comprising, ox lard, resin and zinc chlorid in or about the proportions named melted to a molten state and mixed with an admixture of sesame and water boiled to a soft paste.

CHARLES LESLIE BONSTEEL.